US008694229B2

(12) United States Patent
Hagari et al.

(10) Patent No.: US 8,694,229 B2
(45) Date of Patent: Apr. 8, 2014

(54) KNOCK CONTROL APPARATUS FOR INTERNAL COMBUSTION ENGINE

(75) Inventors: Hideki Hagari, Chiyoda-ku (JP); Yuhei Matsushima, Chiyoda-ku (JP); Keitaro Ezumi, Aki-gun (JP); Tomokuni Kusunoki, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 272 days.

(21) Appl. No.: 13/226,999

(22) Filed: Sep. 7, 2011

(65) Prior Publication Data

US 2012/0073543 A1    Mar. 29, 2012

(30) Foreign Application Priority Data

Sep. 29, 2010    (JP) .................................. 2010-218857

(51) Int. Cl.
*F02P 5/152*    (2006.01)

(52) U.S. Cl.
USPC .................. 701/111; 123/406.21; 123/406.29; 123/406.37

(58) Field of Classification Search
USPC ........... 701/111; 123/406.21, 406.29, 406.34, 123/406.37, 406.39; 73/35.04, 35.05, 73/114.02
See application file for complete search history.

(56) References Cited

U.S. PATENT DOCUMENTS

| 7,043,353 | B2 * | 5/2006 | Takemura et al. ............ 701/111 |
| 7,788,022 | B2 * | 8/2010 | Hagari ......................... 701/111 |
| 2001/0002590 | A1 * | 6/2001 | Cianciara et al. .......... 123/406.2 |
| 2005/0143900 | A1 * | 6/2005 | Kantschar et al. ............ 701/111 |
| 2010/0174472 | A1 * | 7/2010 | Matsushima et al. ......... 701/111 |
| 2012/0192833 | A1 * | 8/2012 | Hagari et al. ............ 123/406.35 |
| 2013/0166183 | A1 * | 6/2013 | Matsushima et al. ......... 701/111 |

FOREIGN PATENT DOCUMENTS

| JP | 3-20593 B2 | 3/1984 |
| JP | 63-080074 A | 4/1988 |
| JP | 2005-127154 A | 5/2005 |

* cited by examiner

*Primary Examiner* — Hai Huynh
(74) *Attorney, Agent, or Firm* — Sughrue Mion, PLLC

(57) ABSTRACT

A knock correction amount computation portion computes, on the basis of intensity of a knock in a case where the presence of an occurrence of the knock is determined, a knock correction amount by which to move a spark timing of the internal combustion engine to be on a retard side and returns the knock correction amount to be back on an advance side in a case where the absence of an occurrence of a knock is determined. In a case where a value of the knock correction amount to be on the retard side becomes equal to or exceeds a predetermined value, the knock correction amount computation portion limits and holds the knock correction amount at the predetermined value and returns the limited knock correction amount to be back on the advance side in a case where the absence of an occurrence of a knock is determined.

5 Claims, 8 Drawing Sheets

KNOCK CONTROL APPARATUS FOR INTERNAL COMBUSTION ENGINE

BACKGROUND OF THE INVENTION

1. Field of the Invention

The present invention relates to a knock control apparatus that controls a knock occurring in an internal combustion engine.

2. Background Art

There has been a method of detecting a knock phenomenon occurring in an internal combustion engine using a vibration sensor (hereinafter, referred to as the knock sensor) directly installed to the block of the internal combustion engine. When a knock occurs while the internal combustion engine is running, vibrations in a specific frequency band corresponding to a bore diameter of the internal combustion engine and a vibrational mode of a knock are known to occur. A knock is therefore detected by measuring vibration intensity at this specific frequency.

There is also a knock control method of suppressing a knock by correcting a spark timing to the retard side when a knock is detected and minimizing a torque reduction by returning back a spark timing to on the advance side when no knock is detected. As a characteristic of the internal combustion engine, it is known that an output torque of the internal combustion engine is enhanced whereas a knock occurs readily when a spark timing is advanced and conversely an output torque of the internal combustion engine is reduced whereas a knock hardly occurs when a spark timing is retarded. The internal combustion engine is therefore controlled to run at a knock limit spark timing at which the largest torque is generated while suppressing the occurrence of a knock by correcting a spark timing to be on the retard side when a knock is detected and by returning a spark timing to be back on the advance side when no knock is detected. It should be noted, however, that there is a case where no knock occurs when a spark timing is advanced to the extent at which a torque reaches the maximum while the internal combustion engine is run by a low load. The knock control described above is not necessary in such a running region.

In a case where such knock control is performed, a spark timing correction method is necessary to suppress a knock in a reliable manner when a knock is detected and also to minimize a torque reduction when no knock is detected. In particular, because a compression ratio tends to be set high (this causes a knock to readily occur) in these days to enhance fuel efficiency of the internal combustion engine, such knock control is becoming more crucial. As such a method, there have been proposed a method of minimizing a torque reduction by changing a return rate to the advance side when no knock is detected and a method of reducing a spark timing correction amount by which the spark timing is further retarded when a knock is detected in a case where the spark timing has been corrected to the retard side.

More specifically, Patent Document 1 discloses a spark timing control method for an internal combustion engine by which a spark timing is corrected to the retard side by a predetermined amount when a knock is detected and when no knock is detected, a return rate to the advance side is increased when a spark timing correction amount is greater than a predetermined value and a return rate to the advance side is decreased when the spark timing correction amount is smaller than the predetermined value.

Also, Patent Document 2 discloses a spark timing control apparatus for an internal combustion engine that calculates a retard correction amount according to knock intensity when a knock is detected and magnitude of a retard correction amount at that time and lowers a return rate to the advance side with time when no knock is detected.

Further, Patent Document 3 discloses a knock control apparatus for internal combustion engine that changes a retard correction amount when a knock is detected and a return rate when no knock is detected according to a spark timing and a learning value.

Patent Document 1: JP-B-3-20593
Patent Document 2: JP-A-63-80074
Patent Document 3: JP-A-2005-127154

The method in the related art disclosed in Patent Document 1 achieves an advantage that a torque down amount is suppressed in comparison with a case where a return rate is constant when an over-retarded spark timing is returned back to the advance side. However, because a spark timing has been corrected to be on the retard side by a predetermined amount when a knock is detected, there are a problem that knocks occur successively due to an insufficient retard correction amount depending on the magnitude of a knock and a problem that excessive torque down or torque fluctuation occurs due to an excess retard correction amount. Also, there is another problem that it is necessary to match the magnitude of a spark timing correction amount by which a return rate is changed to the advance side.

The apparatus in the related art disclosed in Patent Document 2 achieves an advantage that an adequate retard correction amount is obtained because a retard correction amount corresponding to knock intensity and the magnitude of a retard correction amount at this time can be obtained. However, for a large knock occurring unexpectedly in the vicinity of the knock limit spark timing, although it is thought that such an advantage can be achieved by some measure, a retard correction amount is still excessive, and there is a problem that a torque down occurs excessively. Also, there is another problem that when a return rate to the advance side is lowered with time, the spark timing is returned back to the advance side with a delay when a retard correction amount is excessive, thereby causing a torque down to occur excessively.

Further, as has been described, there is a case in these days where a compression ratio is set high in order to enhance fuel efficiency of the internal combustion engine. However, a knock occurs more readily in an internal combustion engine set at a high compression ratio (for example, a compression ratio of about 14:1) than in an internal combustion engine set at a normal compression ratio (for example, a compression ratio of about 10:1). Such being the case, the basic spark timing tends to be set on the retard side where a gradient of the torque characteristic is steep. Hence, in an internal combustion engine set at a high compression ratio, when a retard correction amount is calculated on the basis of the knock intensity upon detecting a knock, there is a tendency that a torque down amount increases more than in a case where the retard correction amount is calculated in the same manner for an internal combustion engine set at a normal compression ratio. As has been described, in an internal combustion engine set at a high compression ratio there is a problem that a toque down amount readily increases, that is, a spark timing is readily retarded excessively in comparison with an internal combustion engine set at a normal compression ratio even when the retard correction amount is the same.

Further, the apparatus in the related art disclosed in Patent Document 3 also has the same problems as those of the method and the apparatus in the related art disclosed in Patent Documents 1 and 2.

SUMMARY OF THE INVENTION

The invention solves the problems with the method and the apparatus in the related art as discussed above and has an object to provide a knock control apparatus for an internal combustion engine that controls a spark timing by calculating an adequate knock correction amount to suppress a knock when a knock is detected in an internal combustion engine and by returning a knock control amount to avoid a toque down from occurring excessively when no knock is detected.

A knock control apparatus for an internal combustion engine according to one aspect of the invention includes: a knock sensor that detects a vibration of the internal combustion engine; a knock determination portion that determines a presence or absence of an occurrence of a knock in the internal combustion engine on the basis of an output of the knock sensor; and a knock correction amount computation portion that computes, on the basis of intensity of a knock that occurs when the presence of an occurrence of a knock is determined by the knock determination portion, a knock correction amount by which a spark timing of the internal combustion engine is moved to a retard side and returns back the knock correction amount to an advance side when the absence of an occurrence of a knock is determined by the knock determination portion. When a value of the knock correction amount on the retard side becomes equal to or exceeds a predetermined value, the knock correction amount computation portion limits and holds the knock correction amount at the predetermined value and returns back the limited knock correction amount to the advance side when the absence of an occurrence of a knock is determined by the knock determination portion.

A knock control apparatus for an internal combustion engine according to another aspect of the invention includes: a knock sensor that detects a vibration of the internal combustion engine; a knock determination portion that determines a presence or absence of an occurrence of a knock in the internal combustion engine on the basis of an output of the knock sensor; and a knock correction amount computation portion that computes, on the basis of intensity of a knock that occurs when the presence of an occurrence of a knock is determined by the knock determination portion, a knock correction amount by which a spark timing of the internal combustion engine is moved to a retard side and returns back the knock correction amount to an advance side when the absence of an occurrence of a knock is determined by the knock determination portion. When a value of the knock correction amount on the retard side becomes equal to or exceeds a predetermined value, the knock correction amount computation portion limits and holds the knock correction amount at the predetermined value and returns back the limited knock correction amount to the advance side after a predetermined time calculated on the basis of the intensity of a knock that occurs.

It is preferable that the knock control apparatus for internal combustion engine configured as above further includes a counter portion in which is set, at an occurrence of a knock, a count value according to the intensity of a knock that occurs, and that the predetermined time is a time since a knock occurs until the count value in the count portion reaches a predetermined value.

A knock control apparatus for an internal combustion engine according to still another aspect of the invention includes: a knock sensor that detects a vibration of the internal combustion engine; a knock determination portion that determines a presence or absence of an occurrence of a knock in the internal combustion engine on the basis of an output of the knock sensor; and a knock correction amount computation portion that computes, on the basis of intensity of a knock that occurs when the presence of an occurrence of a knock is determined by the knock determination portion, a knock correction amount by which a spark timing of the internal combustion engine is moved to a retard side and returns back the knock correction amount to an advance side when the absence of an occurrence of a knock is determined by the knock determination portion. When a value of the knock correction amount on the retard side becomes equal to or exceeds a predetermined value, the knock correction amount computation portion limits and holds the knock correction amount at the predetermined value, and computes, as a virtual knock correction amount, a knock correction amount by which the spark timing is moved to the retard side when the knock correction amount is not limited to use one of the knock correction amount held at the predetermined value and the computed virtual knock correction amount, whichever has a smaller absolute value, as a knock correction amount by which the spark timing is moved to the retard side.

It is preferable that the knock correction amount computation portion includes a knock limit knock correction amount estimate unit that estimates a knock limit knock correction amount having the smallest absolute value among knock correction amounts with which no knock occurs and calculates a return amount by which the limited knock correction amount is returned back to the advance side on the basis of a difference between the estimated knock limit knock correction amount and one of a current knock correction amount and the virtual knock correction amount.

Further, it is preferable that the knock limit knock correction amount estimate unit calculates the knock limit knock correction amount by filtering one of the knock correction amount and the virtual knock correction amount.

The knock control apparatus for an internal combustion engine according to the one aspect of the invention includes: a knock sensor that detects a vibration of the internal combustion engine; a knock determination portion that determines a presence or absence of an occurrence of a knock in the internal combustion engine on the basis of an output of the knock sensor; and a knock correction amount computation portion that computes, on the basis of intensity of a knock that occurs when the presence of an occurrence of a knock is determined by the knock determination portion, a knock correction amount by which a spark timing of the internal combustion engine is moved to be on a retard side and returns back the knock correction amount to an advance side when the absence of an occurrence of a knock is determined by the knock determination portion, wherein when a value of the knock correction amount on the retard side becomes equal to or exceeds a predetermined value, the knock correction amount computation portion limits and holds the knock correction amount at the predetermined value and returns back the limited knock correction amount to the advance side when the absence of an occurrence of a knock is determined by the knock determination portion. Hence, an adequate knock correction amount can be obtained by calculating a knock retard amount on the basis of the knock intensity when a knock is detected. Further, by limiting and holding the knock correction amount at the predetermined value, it becomes possible to prevent an excessive torque down.

The knock control apparatus for an internal combustion engine according to another aspect of the invention includes: a knock sensor that detects a vibration of the internal combustion engine; a knock determination portion that determines a presence or absence of an occurrence of a knock in the internal combustion engine on the basis of an output of the knock sensor; and a knock correction amount computation portion that computes, on the basis of intensity of a knock that occurs when the presence of an occurrence of a knock is determined by the knock determination portion, a knock correction amount by which a spark timing of the internal combustion engine is moved to retard side and returns back the knock correction amount to an advance side when the absence of an occurrence of a knock is determined by the knock determination portion, wherein when a value of the knock correction amount on the retard side becomes equal to or exceeds a predetermined value, the knock correction amount computation portion limits and holds the knock correction amount at the predetermined value and returns back the limited knock correction amount to the advance side after a predetermined time calculated on the basis of the intensity of a knock that occurred. Hence, an adequate knock correction amount can be obtained by calculating a knock retard amount on the basis of the knock intensity when a knock is detected. Further, by limiting and holding the knock correction amount at the predetermined value, it becomes possible to prevent an excessive torque down. Moreover, it becomes possible to prevent another strong knock from occurring successively after the occurrence of a strong knock.

It is preferable that the knock control apparatus for internal combustion engine configured as above further includes a counter portion in which is set, at an occurrence of a knock, a count value according to the intensity of a knock that occurs, wherein the predetermined time is a time since a knock occurs until the count value in the count portion reaches a predetermined value. When configured in this manner, a predetermined time to return back the limited knock correction amount to the advance side can be set readily.

The knock control apparatus for an internal combustion engine according to still another aspect includes: a knock sensor that detects a vibration of the internal combustion engine; a knock determination portion that determines a presence or absence of an occurrence of a knock in the internal combustion engine on the basis of an output of the knock sensor; and a knock correction amount computation portion that computes, on the basis of intensity of a knock that occurs when the presence of an occurrence of a knock is determined by the knock determination portion, a knock correction amount by which a spark timing of the internal combustion engine is moved to a retard side and returns back the knock correction amount to an advance side when the absence of an occurrence of a knock is determined by the knock determination portion, wherein when a value of the knock correction amount on the retard side becomes equal to or exceeds a predetermined value, the knock correction amount computation portion limits and holds the knock correction amount at the predetermined value, and computes, as a virtual knock correction amount, a knock correction amount by which the spark timing is moved to the retard side when the knock correction amount is not limited to use one of the knock correction amount held at the predetermined value and the computed virtual knock correction amount, whichever has a smaller absolute value, as a knock correction amount by which the spark timing is moved to the retard side. Hence, an adequate knock correction amount can be obtained by calculating a knock retard amount on the basis of the knock intensity when a knock is detected. Further, by limiting and holding the knock correction amount at the predetermined value, it becomes possible to prevent an excessive torque down. Moreover, matching of the holding time of the knock correction amount after limitation becomes unnecessary.

It is preferable for the knock control apparatus for an internal combustion engine configured as above that the knock correction amount computation portion includes a knock limit knock correction amount estimate unit that estimates a knock limit knock correction amount having the smallest absolute value among knock correction amounts with which no knock occurs and calculates a return amount by which the limited knock correction amount is returned back to the advance side on the basis of a difference between the estimated knock limit knock correction amount and one of a current knock correction amount and the virtual knock correction amount. When configured in this manner, it becomes possible to make matching of a spark timing and an advance rate to change a correction amount to the advance side unnecessary.

Further, it is preferable for the knock control apparatus for an internal combustion engine configured as above that the knock limit knock correction amount estimate unit calculates the knock limit knock correction amount by filtering one of the knock correction amount and the virtual knock correction amount. When configured in this manner, it becomes possible to estimate a knock limit knock correction amount through a simple computation.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

First Embodiment

Figure 1:
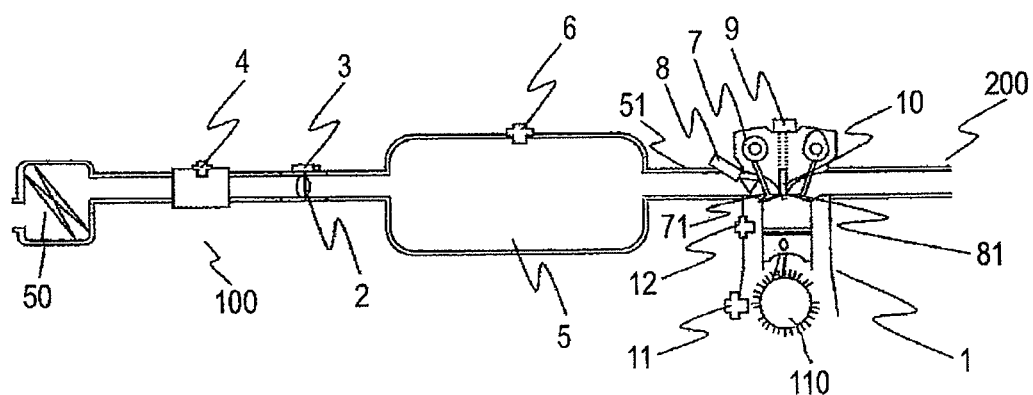
FIG. 1 is a view schematically showing the configuration of an internal combustion engine to which a knock control apparatus for an internal combustion engine according to a first embodiment of the invention is applied.

Hereinafter, a knock control apparatus for an internal combustion engine according to a first embodiment of the invention will be described in detail with reference to the drawings. FIG. 1 is a view schematically showing the configuration of an internal combustion engine to which the knock control apparatus for an internal combustion engine according to the first embodiment of the invention is applied. Although the internal combustion engine for vehicle, such as an automobile, normally includes a plurality of cylinders and pistons, only one cylinder and one piston are shown in FIG. 1 for ease of description.

Referring to FIG. 1, an air filter 50 is provided upstream of an inlet system 100 of an internal combustion engine 1 and a surge tank 5 that stores air taken in through the air filter 50 is provided downstream thereof. The surge tank 5 is connected to a plurality of cylinders of the internal combustion engine 1 via an intake manifold 51.

An electronically-controlled throttle valve 2 provided upstream of the surge tank 5 adjusts an intake air flow of the inlet system 100 as the opening thereof is controlled electronically. An air flow sensor 4 provided upstream of the electrically-controlled throttle valve 2 measures an intake air flow in the inlet system 100 and outputs an intake air flow signal corresponding to the measured value.

A throttle opening sensor 3 measures the opening of the electrically-controlled throttle valve 2 and outputs a throttle valve opening signal corresponding to the measured value. A mechanical throttle valve directly connected to an unillustrated accelerator pedal with a wire may be used instead of the electronically-controlled throttle valve 2.

An intake manifold pressure sensor 6 provided to the surge tank 5 measures an internal intake pressure of the surge tank 5 and hence an internal intake pressure of the intake manifold 51 and outputs an intake manifold pressure signal corresponding to the measured value. In the first embodiment, both the air flow sensor 4 and the intake manifold pressure sensor 6 are provided. However, either of these sensors alone may be provided.

An inlet valve 71 is provided to an inlet port formed downstream of the surge tank 5 and opening and closing timings thereof are under variable control of a variable intake valve mechanism 7. An injector 8 that ejects fuel is provided to the intake port. The injector 8 may be provided in such a manner so as to eject fuel directly into the cylinder of the internal combustion engine 1.

An ignition coil 9 that ignites an air-fuel mixture inside the cylinder and an ignition plug 10 formed integrally with the ignition coil 9 are provided to a cylinder head of the internal combustion engine 1. Also, a plate 110 with a plurality of edges formed on the peripheral surface at predetermined intervals is provided to the crankshaft of the internal combustion engine 1. A crank angle sensor 11 is provided oppositely to the edges of the plate 110 to detect the edges of the plate 110 rotating with the crankshaft and to output a pulse signal in synchronization with installation intervals of the respective edges. A knock sensor 12 provided to the internal combustion engine 1 outputs a vibrational waveform signal according to a vibration of the internal combustion engine 1.

An exhaust valve 81 provided to an exhaust port of the cylinder opens so that an exhaust gas is emitted from inside of the cylinder to an exhaust system 200. A catalytic device (not shown) that purifies the exhaust gas is provided downstream of the exhaust system 200.

Figure 2:
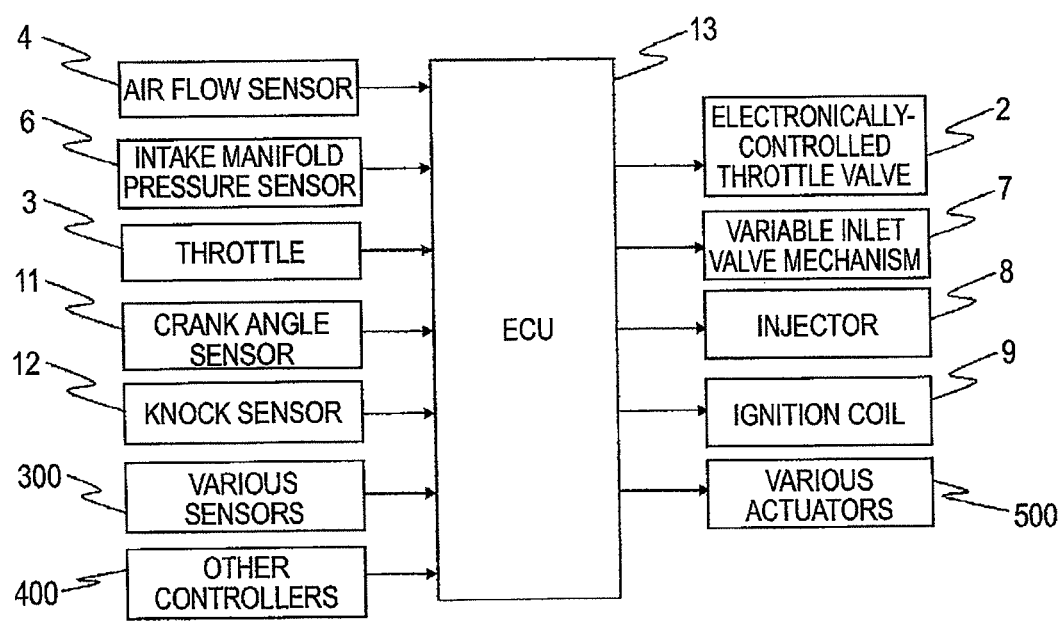
FIG. 2 is a block diagram showing the configuration of the knock control apparatus for an internal combustion engine according to the first embodiment of the invention.

FIG. 2 is a block diagram showing the configuration of the knock control apparatus for internal combustion engine according to the first embodiment of the invention. Referring to FIG. 2, an electronic control unit (hereinafter, abbreviated as ECU) 13 of the internal combustion engine 1 is formed of an arithmetic device, such as a micro computer, and an intake air flow signal outputted from the air flow sensor 4, an intake manifold pressure signal outputted from the intake manifold pressure senor 6, a throttle valve opening signal outputted from the throttle opening sensor 3, a pulse signal in synchronization with installment intervals of the edges of the plate 110 outputted from the crank angle sensor 11, and a vibrational waveform signal of the internal combustion engine 1 outputted from the knock sensor 12 are individually inputted therein.

Besides the signals described above, signals corresponding to respective measured values from other unillustrated various sensors 300 are also inputted into the ECU 13. Further, signals from other controllers 400, for example, an automatic transmission control system, a brake control system, and a traction control system, are also inputted therein.

The ECU 13 calculates a target throttle opening on the basis of the accelerator opening and the running condition of the internal combustion engine 1 and controls the opening of the electrically-controlled throttle valve 2 on the basis of the calculated target throttle opening. Also, the ECU 13 not only variably controls the opening and closing timings of the inlet valve 71 by controlling the variable inlet valve mechanism 7 according to the running condition of the internal combustion engine 1 but also controls a fuel injection amount by driving the injector 8 so as to reach a target air-fuel ratio. Further, the ECU 13 controls a spark timing by controlling energization to the ignition coil 9 so as to achieve a target spark timing.

Also, when a knock in the internal combustion engine 1 is detected as will be described below, the ECU 13 also performs control to suppress the occurrence of a knock by setting the target spark timing to the retard side. Further, the ECU 13 calculates an instruction value to control various actuators 500 other than those described above and controls the various actuators 500 on the basis of the instruction value.

Figure 3:
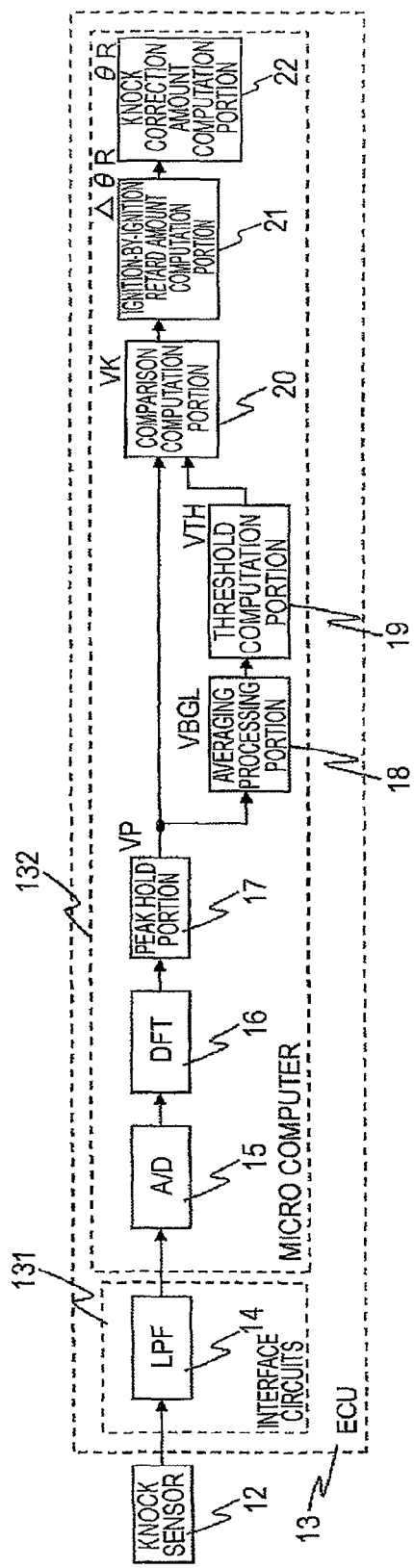
FIG. 3 is a block diagram showing the configuration of a knock control portion in the knock control apparatus for an internal combustion engine according to the first embodiment of the invention.

The configuration and an operation of a knock control portion formed within the ECU 13 will now be described. FIG. 3 is a block diagram showing the configuration of the knock control portion in the knock control apparatus for internal combustion engine according to the first embodiment of the invention. Referring to FIG. 3, the knock control portion formed within the ECU 13 includes various interface (I/F) circuits 131 and a micro computer 132. An interface circuit for knock control in the various interface circuits 131 includes a low-pass filter (hereinafter, abbreviated as LPF) 14 that receives a vibrational waveform signal of the internal combustion engine 1 outputted from the knock sensor 12 and eliminates a high-frequency component from the vibrational waveform signal.

The micro computer 132 as a whole is formed of an Analogue-to-Digital converter that converts an analog signal to a digital signal, a ROM region in which a control program and a control constant are stored, and a RAM region in which a variable is stored when a program is executed. The knock control portion includes an Analogue-to-Digital converter 15, a DFT processing portion 16, a peak hold portion 17, an averaging processing portion 18, a threshold computation portion 19, a comparison computation portion 20, an ignition-by-ignition retard amount computation portion 21, and a knock correction amount computation portion 22.

As has been described, the LPF 14 receives a vibrational waveform signal of the internal combustion engine 1 outputted from the knock sensor 12 and eliminates a high-frequency component from the vibrational waveform signal. However, for the Analogue-to-Digital converter 15 to take in the entire vibrational component, the center of the vibrational component is set to 2.5 [V], for example, by adding a bias of 2.5 [V], so that the vibrational component falls within the range from 0 to 5 [V] having its center at 2.5 [V]. The LPF 14 is also furnished with a gain conversion function of amplifying the vibrational component with a center thereof at 2.5 [V] in a case where the vibrational component of a vibrational signal from the knock sensor 12 is small and reducing the vibrational component with a center thereof at 2.5 [V] when the vibrational component is large.

The Analogue-to-Digital converter 15 converts a vibrational waveform signal from the knock sensor 12, from which a high-frequency component is eliminated in the LPF 14, to a digital signal. Analogue-to-Digital conversion by the Analogue-to-Digital converter 15 is executed at certain time intervals, for example, in every 10 [μs] or every 20 [μs].

It may be configured in such a manner that the Analogue-to-Digital converter 15 constantly performs Analogue-to-Digital conversion on an analog signal from the LPF 14 and only data in a period during which a knock occurs in the internal combustion engine 1, for example, a knock detection period set from a top death center (hereinafter, abbreviated as TDC) of the piston to 50° CA after a top death center (hereinafter, abbreviated as ATDC), is sent to and beyond the DFT processing portion 16. Alternatively, it may be configured in such a manner that Analogue-to-Digital conversion is performed only in a knock detection period set, for example, from TDC to 50° CA ATDC to send the data in this period to and beyond the DFT processing portion 16.

The DFT processing portion 16 performs a time and frequency analysis on a digital signal from the Analogue-to-Digital converter 15. To be more concrete, a spectral sequence of a knock-specific frequency component in every predetermined time is calculated by processing, for example, discrete Fourier transform (DFT) or short-time Fourier transform (STFT). As the digital signal processing by the DFT processing portion 16, a knock-specific frequency component may be extracted using an infinite impulse response (IIR) filter or a finite impulse response (FIR) filter.

The DFT processing portion 16 starts the processing after the completion of the Analogue-to-Digital conversion by the Analogue-to-Digital converter 15 during the knock detection period described above and ends the processing before the start of interruption processing in synchronization with a crank angle, for example, interruption processing at 75° CA before a top death center (hereinafter, abbreviated as BTDC), by which processing from the one by the peak hold portion 17 to the one by the knock correction amount computation portion 22 described below is performed.

The peak hold portion 17 calculates a peak hold value of the spectral sequence calculated by the DFT processing portion 16. The averaging processing portion 18 filters the peak hold value calculated by the peak hold portion 17 in every stroke of the internal combustion engine 1 using Equation (1) below to average the peak hold value:

$$VBGL(n)=K1 \times VBGL(n-1)+(1-K1) \times VP(n) \quad \text{Equation (1)}$$

where VBGL(n) is a filter value, VP(n) is a peak hold value, K1 is a filter coefficient, and n is the number of stroke(s).

For example, a value of about "0.95" is used as the filter coefficient K1 to eliminate a high-frequency component of the peak hold value VP(n).

In the subsequent threshold computation portion 19, a threshold value for knock determination is obtained in accordance with following Equation (2):

$$VTH(n)=VBGL(n) \times Kth+Vofs \quad \text{Equation (2)}$$

where VTH(n) is a threshold value, Kth is a threshold coefficient, Vofs is a threshold offset, and n is the number of stroke(s).

The threshold coefficient Kth and the threshold offset Vofs are set by matching so that the threshold value VTH(n) becomes greater than the peak hold value VP(n) when no knock occurs and the threshold value VTH(n) becomes smaller than the peak hold value VP(n) when a knock occurs.

The comparison computation portion 20 compares the peak hold value VP(n) calculated by the peak hold portion 17 with the threshold value VTH(n) computed by the threshold computation portion 19 and determines the presence or absence of the occurrence of a knock in accordance with Equation (3) below to output a signal corresponding to knock intensity VK(n):

$$VK(n) \max\{VP(n)-VTH(n), 0\} \quad \text{Equation (3)}$$

where VK (n) is knock intensity and n is the number of stroke(s).

The comparison computation portion 20 determines the presence of the occurrence of a knock when the computation result of Equation (3) above is [VK(n)>0].

The ignition-by-ignition retard amount computation portion 21 computes a retard amount (hereinafter, referred to as the ignition-by-ignition retard amount) ΔθR(n) corresponding to knock intensity in every ignition by a method described below with the knock intensity VK(n) calculated by the comparison computation portion 20 and the maximum value of the ignition-by-ignition retard amount.

The knock correction amount computation portion 22 computes a knock correction amount θR(n) at a spark timing by adding up the ignition-by-ignition retard amount ΔθR(n) computed by the ignition-by-ignition retard amount computation portion 21 when a knock occurs and by adding up an advance return amount when no knock occurs. A computation of the knock correction amount θR (n) will be described in detail below.

The micro computer 132 in the ECU 13 calculates a final spark timing in accordance with Equation (4) below using the knock correction amount ΘR(n) computed as described above:

$$\theta IG(n)=\theta B(n)+\theta R(n) \quad \text{Equation (4)}$$

where θIG(n) is a final spark timing and θB(n) is a basic spark timing.

Herein, the advance side is positive and the retard side is negative for all the ignition-by-ignition retard amount ΔθR (n), the knock correction amount θR(n), the basic spark timing θB(n), and the final spark timing θIG(n).

Figure 4:
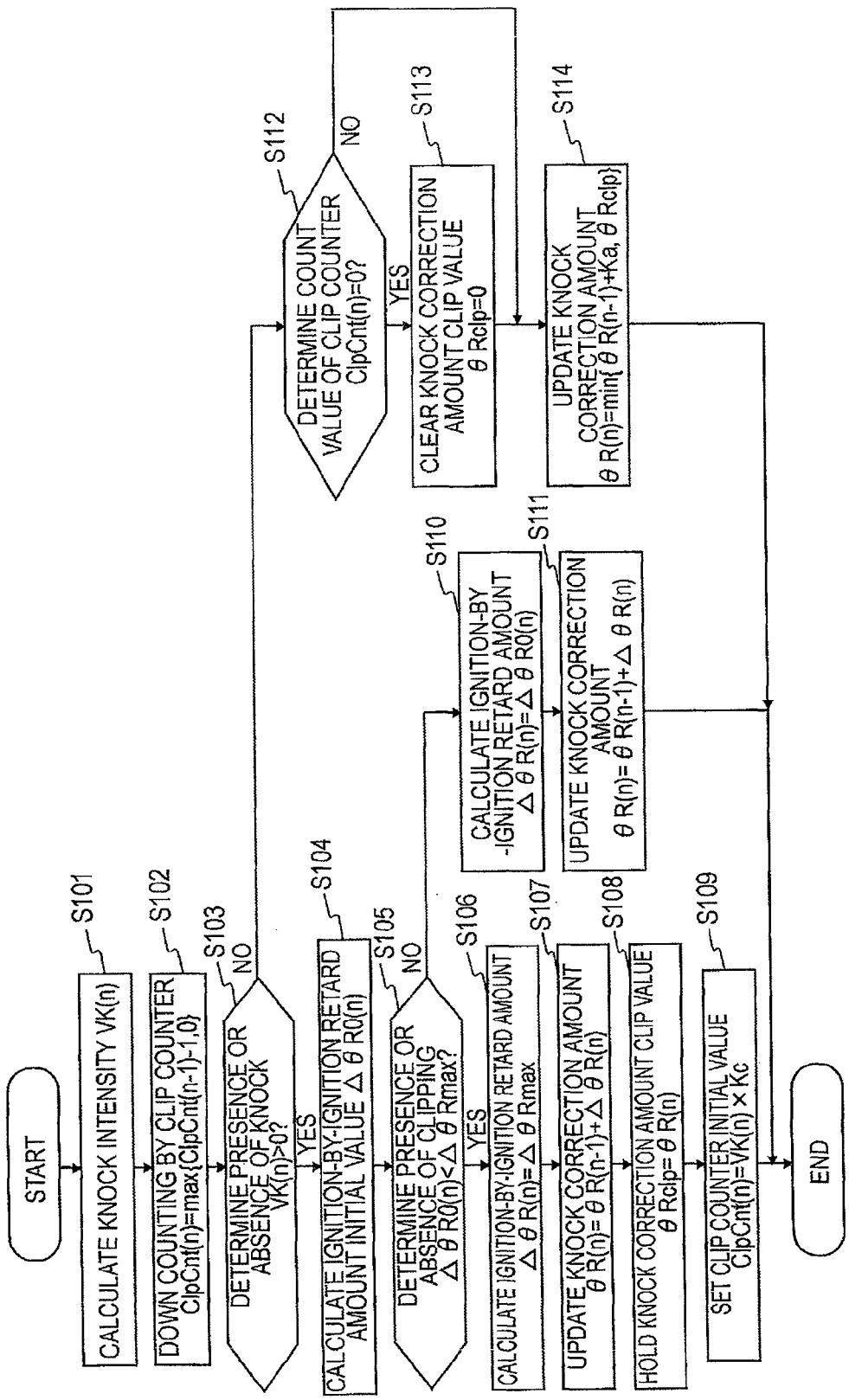
FIG. 4 is a flowchart depicting an operation of the knock control apparatus for an internal combustion engine according to the first embodiment of the invention.

The configuration of the knock control portion formed within the ECU 13 has been described. Computation processing of the ignition-by-ignition retard amount ΔθR(n) by the ignition-by-ignition retard amount computation portion 21 and computation processing of the knock correction amount θR(n) by the knock correction amount computation portion 22 referred to above will now be described. FIG. 4 is a flowchart showing an operation of the knock control apparatus for an internal combustion engine according to the first embodiment of the invention. In particular, it shows processing in the ignition-by-ignition retard amount computation portion 21 and knock correction amount computation portion 22. Processing shown in FIG. 4 is performed, as has been described above, by interruption processing in synchronization with a crank angle, for example, by interruption processing a 75° CA BTDC.

Referring to FIG. 4, the knock intensity VK(n) is calculated first in Step S101. The knock intensity VK(n) is calculated by the comparison computation portion 20 in accordance with Equation (3) above. In subsequent Step S102, down counting of a clip counter ClpCnt(n) is performed. The clip counter ClpCnt(n) is a down counter that counts a time during which clipping of a knock correction amount is continued and forms a counter portion in the first embodiment of the invention.

In subsequent Step S103, as the description given above for the comparison computation portion 20, the presence or absence of a knock is determined on the basis of whether the knock intensity VK(n) is greater than "0". When the determination result in Step S103 is [VK(n)>0] and the presence of a knock is determined (Yes), the flow proceeds to Step S104. When the absence of a knock is determined (No), the flow proceeds to Step S112.

As the flow proceeds to Step S104 because the presence of a knock is determined in Step S103 (Yes), an ignition-by-ignition retard amount initial value ΔθR0(n) is calculated in Step S104 by the ignition-by-ignition retard amount computation portion 21 in accordance with following Equation (5):

$$\Delta\theta R0(n) = -VK(n)/VTH(n) \times Kg \quad \text{Equation (5)}$$

where ΔθR0(n) is an ignition-by-ignition retard amount initial value and Kg is a retard amount reflection coefficient.

Herein, because the ignition-by-ignition retard amount initial value ΔθR0(n) is a correction amount in a retard direction, it takes a negative value. The retard amount reflection coefficient Kg is set by matching so that, for example, in a case where a knock occurs with an advance of "2" deg CA from the knock limit spark timing, about "−2" deg CA is calculated as the ignition-by-ignition retard amount initial value ΔθR0(n).

In subsequent Step S105, the ignition-by-ignition retard amount initial value ΔθR0(n) is compared with the ignition-by-ignition retard amount maximum value ΔθRmax to determine the presence or absence of clipping. The ignition-by-ignition retard amount maximum value ΔθRmax is set, for example, to a value in a range from about "−1" deg CA to "−3" deg CA, so that neither a torque reduction amount becomes excessively large nor a retard amount becomes significantly insufficient. Regarding the determination on the presence or absence of clipping, because the ignition-by-ignition retard amount initial value ΔθR0(n) is a correction amount in the retard direction and takes a negative value as described above, the presence of clipping is determined when [ΔθR0(n)<ΔθRmax] is established.

When the presence of clipping is determined from the determination result in Step S105 (Yes), the flow proceeds to Step S106, in which the ignition-by-ignition retard amount maximum value ΔθRmax is substituted for the ignition-by-ignition retard amount ΔθR(n) to obtain [ΔθR(n)=ΔθRmax]. In subsequent Step S107, the knock correction amount θR(n) is updated to [θR(n)=ΔθR(n−1)+ΔθR(n)] with the last knock correction amount θR(n−1) and the ignition-by-ignition retard amount ΔθR(n).

Subsequently, the updated knock correction amount θR(n) is held as a knock correction amount clip value θRclp in Step S108 and, in subsequent Step S109, the initial value of the clip counter ClpCnt(n) is calculated as [ClpCnt(n)=VK(n)×Kc] with the knock intensity VK(n) and a clip time reflection coefficient Kc. The processing is then ended.

The clip time reflection coefficient Kc is set by matching so that, for example, when a knock occurs with an advance of 4 deg CA from the knock limit spark timing, about "2" seconds is found for an average value of the knock intensity VK(n) calculated when a knock occurs.

Subsequently, when the absence of clipping is determined from the determination result in Step S105 (No), more specifically, when [ΔθR0(n)<ΔθRmax] is not established (No) because, as has been described above, the ignition-by-ignition retard amount initial value ΔθR0(n) is a correction amount in the retard direction and takes a negative value, the flow proceeds to Step S110, in which the ignition-by-ignition retard amount initial value ΔθR0(n) is substituted for the ignition-by-ignition retard amount ΔθR(n) to obtain [ΔθR(n)=ΔθR0(n)]. In subsequent Step S111, the knock correction amount θR(n) is updated to [θR(n)=ΔθR(n−1)+ΔθR(n)] with the last knock correction amount θR(n−1) and the ignition-by-ignition retard amount ΔθR(n) and the processing is ended.

The computation of the knock correction amount θR(n) is performed in the manner as described above when the presence of a knock is determined in Step S103.

A case where the absence of a knock is determined in Step S103 (No) will now be described. When the flow proceeds from Step S103 to Step S112, a determination is made as to whether the count value of the clip counter ClpCnt(n) is "0". When the count value of the clip counter ClpCnt(n) is found to be "0" from the determination result (Yes), it is not necessary to hold the knock correction amount clip value. The flow therefore proceeds to Step S113, in which the knock correction amount clip value θRclp is cleared to "0". The flow then proceeds to Step S114.

When the count value of the clip counter ClpCnt(n) is not found to be "0" from the determination result in Step S112 (No), the flow proceeds to Step S114 while the knock correction amount clip value θRclp is held. In Step S114, the knock correction amount θR(n) is updated to [θR(n)=min{ΔθR(n−1)+Ka, θRclp}] with the last knock correction amount θR(n−1) and a knock correction amount advance return amount Ka (positive value). However, the updated value is clipped to the knock correction amount clip value θRclp. The knock correction amount advance return amount Ka is set, for example to a value with which an advance of about 1 deg CA is made for 2 seconds or 200 strokes.

The computation of the knock correction amount θR(n) is performed in the manner as described above in a case where the absence of a knock is determined in Step S103.

Figure 5:
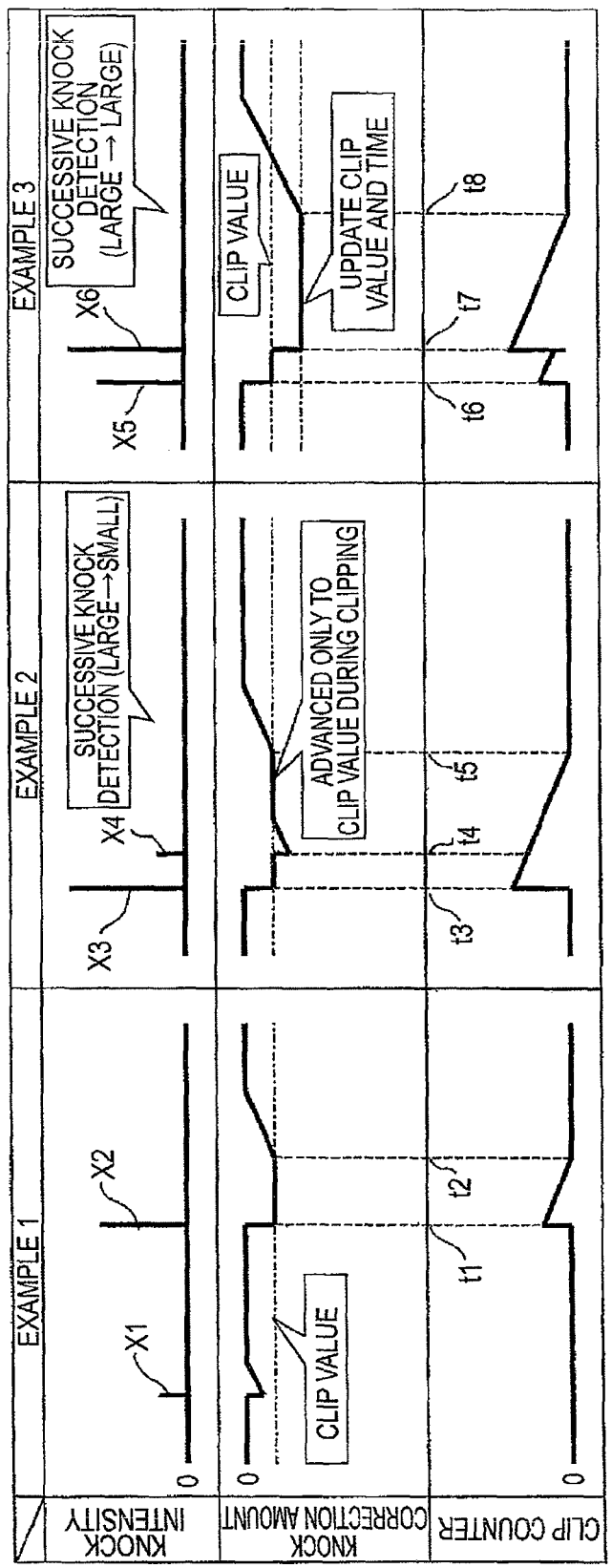
FIG. 5 is a time chart used to describe an operation of the knock control apparatus for an internal combustion engine according to the first embodiment of the invention.

FIG. 5 is a time chart used to describe an operation of the knock control apparatus for an internal combustion engine according to the first embodiment of the invention. In particular, FIG. 5 shows an operation in a case where the knock correction amount θR(n) described above in accordance with the flowchart of FIG. 4 is computed. The terms, "a small knock" and "a large knock", referred to in the following description mean a case where a knock correction amount does not cross the clip value and a case where a knock correction amount crosses the clip value, respectively.

Referring to FIG. 5, Example 1 is a case where a knock correction amount by a small knock X1 and a knock correction amount by a large knock X2 do not overlap. In the case of Example 1, the knock correction amount is clipped to the clip value at a time point t1. However, the clip counter is set at the time t1 at which the knock correction amount is clipped and the knock correction amount is held at the clip value until a time point t2 at which the clip counter becomes "0".

Example 2 in FIG. 5 is a case where a large knock X3 and a small knock X4 are detected in succession. In this case, a knock correction amount is clipped at a time point t3 at which the large knock X3 is detected and the clip counter is set at the same time. The clip counter becomes "0" at a time point t5. The knock correction amount is held at the clip value from the time point t3 to the time point t5. When the small knock X4 is detected at a time point t4 between the time points t3 and t5 during which the knock correction amount is clipped, a further knock correction is made. However, because the knock correction amount is being kept clipped, the knock correction amount is advanced only to the clip value in this case.

Example 3 in FIG. 5 is a case where large knocks X5 and X6 are detected in succession at time points t6 and t7, respectively. In this case, the knock correction amount is clipped to the clip value at the time point t6 at which the large knock X5 is detected and the clip counter is set at the same time. However, the clip value is updated at the time point t7 at which the next large knock X6 is detected and the knock correction amount is clipped to the updated clip value. Also, the clip counter is updated at the time point t7 and becomes "0" at an updated time point t8. More specifically, the knock correction amount is held at the initial clip value from the time point t6 to the time point t7 and held at the updated clip value from the time point t7 to the time point t8.

With the knock control apparatus for internal combustion engine according to the first embodiment of the invention, it becomes possible to calculate a knock correction amount corresponding to the knock intensity when a knock is detected by performing the computation of the knock correction amount in the manner as described above. Further, by limiting and holding the knock correction amount at a predetermined value, it becomes possible to suppress the occurrence of excessive torque down and torque fluctuation even for a large knock that occurs unexpectedly.

Further, with the knock control apparatus according to the first embodiment of the invention, because the temperature inside the cylinders drops while the knock correction amount is held at the clip value, a probability that a large knock occurs unexpectedly again at the time of an advance return is lowered. Also, when a spark timing has been advanced considerably from the knock limit spark timing, knocks may possibly occur in succession due to an insufficient knock correction amount because the knock correction amount is limited. However, because a spark timing is generally controlled to be in the vicinity of the knock limit spark timing, a probability of the successive occurrence of knocks can be made low by adequately setting the clip value of the knock correction amount.

Second Embodiment

A knock control apparatus for an internal combustion engine according to a second embodiment of the invention will now be described. The configuration of the knock control apparatus for internal combustion engine according to the second embodiment is the same as that of the first embodiment described above with reference to FIGS. 1 and 3. In the second embodiment, however, a computation of the ignition-by-ignition retard amount $\Delta\theta R(n)$ by the ignition-by-ignition retard amount computation portion 21 and a computation of the knock correction amount $\theta R(n)$ by the knock correction amount computation portion 22 in FIG. 3 are performed differently from the manners in the first embodiment above.

Also, in contrast to the first embodiment above where it is necessary to match a holding time of the knock correction amount clip value, in the second embodiment, the clip counter used in the first embodiment above is not used to make the matching of a holding time of the clip value unnecessary by calculating a virtual knock correction amount anticipated when the knock correction amount is not limited and held at a predetermined value when a knock is detected, that is, when control is performed in the same manner as in the related art, and by setting either the virtual knock correction amount or the knock correction amount limited and held at the predetermined value, whichever is more on the advance side, as a final knock correction amount. When configured in this manner, it becomes possible to readily make a time since the detection of a knock until an advance return is made to the spark timing at which the knock occurred by the control in the related art equal to such a time by the control according to the second embodiment of the invention. Accordingly, it becomes possible to suppress the occurrence of excessive torque down and torque fluctuation while ensuring the knock control performance as good as that of the apparatus in the related art. In short, a virtual knock correction amount is used instead of the clip counter in the second embodiment.

Figure 6:
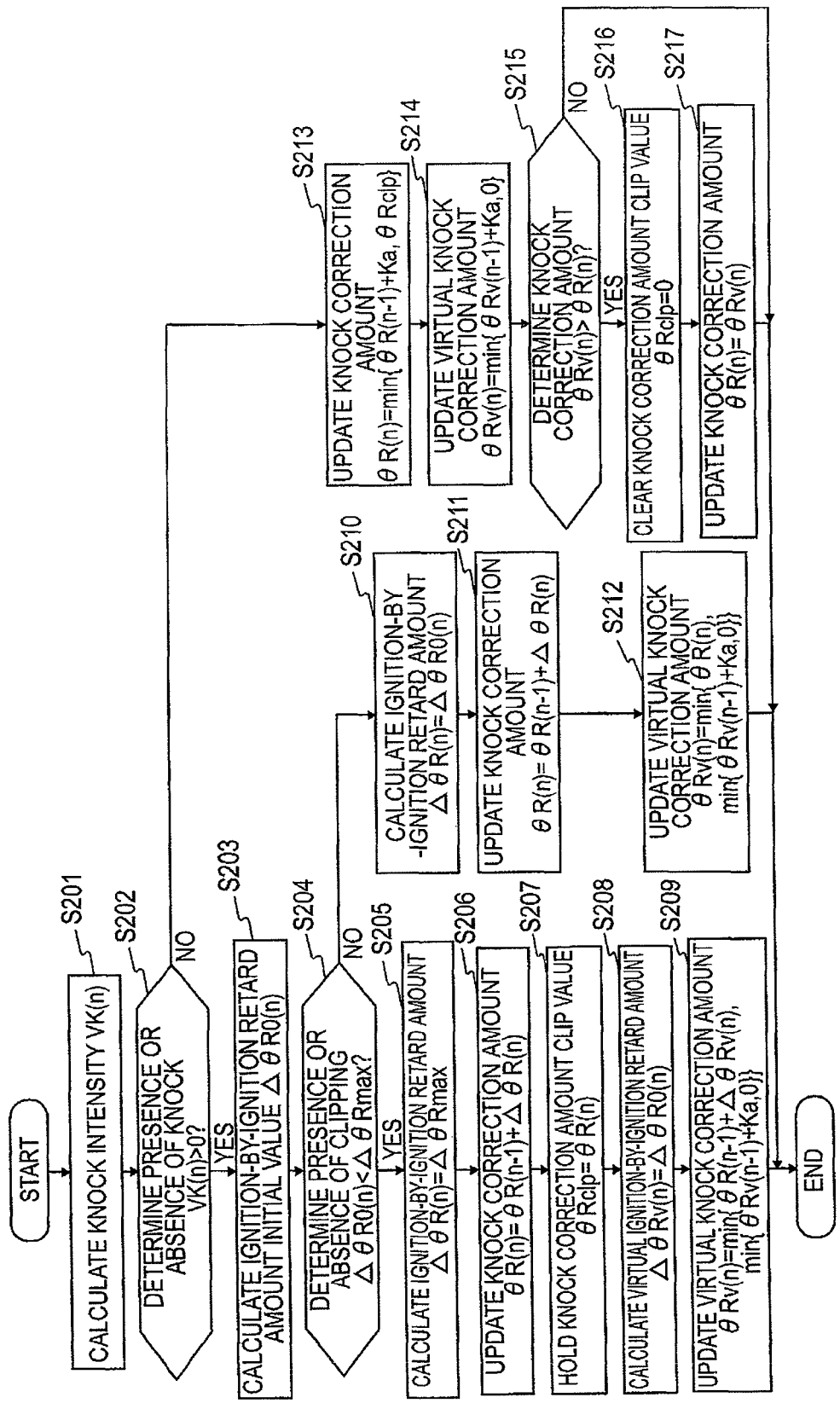
FIG. 6 is a flowchart depicting an operation of a knock control apparatus for an internal combustion engine according to a second embodiment of the invention.

Hereinafter, the knock control apparatus for internal combustion engine according to the second embodiment of the invention will be described in detail. FIG. 6 is a flowchart showing an operation of the knock control apparatus for an internal combustion engine according to the second embodiment of the invention. In particular, it shows processing in the ignition-by-ignition retard amount computation portion and the knock correction amount computation portion. The processing depicted in FIG. 6 is performed by interruption processing in synchronization with a crank angle, for example, by interruption processing at 75° CA BTDC as with the first embodiment above.

Referring to FIG. 6, the knock intensity VK(n) is calculated first in Step S201. The knock intensity VK(n) is calculated by the comparison computation portion 20 shown in FIG. 3 in accordance with Equation (3) described above. In subsequent Step S202, the presence or absence of a knock is determined on the basis of the knock intensity VK(n). More specifically, the presence or absence of a knock is determined on the basis of whether the knock intensity VK(n) is greater than "0". When the determination result in Step S202 is [VK(n)>0] and the presence of a knock is determined (Yes), the flow proceeds to Step S203. When the absence of a knock is determined (No), the flow proceeds to processing in Step S213.

A case where the presence of a knock is determined in Step S202 will be described first. When the flow proceeds from Step S202 to Step S203, an ignition-by-ignition retard amount initial value $\Delta\theta R0(n)$ is calculated by the ignition-by-ignition retard amount computation portion 21 in accordance with Equation (5) above in the same manner as in the first embodiment above.

In subsequent Step S204, the presence or absence of clipping is determined by comparing the ignition-by-ignition retard amount initial value $\Delta\theta R0(n)$ with the ignition-by-ignition retard amount maximum value $\Delta\theta$Rmax. The ignition-by-ignition retard amount maximum value $\Delta\theta$Rmax is set, for example, to a value in the range from about "−1" deg CA to "−3" deg CA, so that neither a torque reduction amount becomes excessively large nor the retard amount becomes significantly insufficient. Regarding the determination on the presence or absence of clipping, because the ignition-by-ignition retard amount initial value $\Delta\theta R0(n)$ is a correction amount in the retard direction and takes a negative value as has been described above, the presence of clipping is determined when [$\Delta\theta R0(n) < \Delta\theta$Rmax] is established.

In a case where the presence of clipping is determined from the determination result in Step S204, the flow proceeds to Step S205, in which the ignition-by-ignition retard amount maximum value $\Delta\theta$Rmax is substituted for the ignition-by-ignition retard amount $\Delta\theta R(n)$ to obtain [$\Delta\theta R(n) = \Delta\theta$Rmax]. In subsequent Step S206, the knock correction amount $\theta R(n)$ is updated to [$\theta R(n) = \Delta\theta R(n-1) + \Delta\theta R(n)$] with the last knock correction amount $\theta R(n-1)$ and the ignition-by-ignition retard amount $\Delta\theta R(n)$.

Subsequently, the updated knock correction amount $\theta R(n)$ is held as the knock correction amount clip value $\theta$Rclp in Step S207. Subsequently, in Step S208, the ignition-by-ignition retard amount initial value $\Delta\theta R0(n)$ is substituted for a virtual ignition-by-ignition retard amount $\Delta\theta Rv(n)$, which is used to calculate a virtual knock correction amount and characteristic of the second embodiment, to obtain [$\Delta\theta Rv(n) = \Delta\theta R0(n)$].

In Subsequent Step S209, one of a value obtained by adding the virtual ignition-by-ignition retard amount $\Delta\theta Rv(n)$ to the last knock correction amount $\theta R(n-1)$ and a value obtained by adding the knock correction amount advance return amount Ka (positive value) to the last virtual knock correction amount θRv(n−1), whichever is more on the retard side, is updated as the virtual knock correction amount θRv(n) and the processing is ended. More specifically, the virtual knock correction amount is updated in Step S209 by calculating [θRv(n)=min{θR(n−1)+ΔθR(n), min{θRv(n−1)+Ka, 0}}].

The virtual knock correction amount anticipated when the knock correction amount is not clipped can be calculated by performing the processing as above.

In a case where the absence of clipping is determined from the determination result in Step S204 (No), in other words, when [ΔθR0(n)<ΔθRmax] is not established (No) because, as has been described, the ignition-by-ignition retard amount initial value ΔθR0(n) is a correction amount in the retard direction and takes a negative value, the flow proceeds to Step S210, in which the ignition-by-ignition retard amount initial value ΔθR0(n) is substituted for the ignition-by-ignition retard amount ΔθR(n) to calculate the ignition-by-ignition retard amount as [ΔθR(n)=ΔθR0(n)]. In subsequent Step S211, the knock correction amount θR(n) is updated to [θR(n)=ΔθR(n−1)+ΔθR(n)] with the last knock correction amount θR(n−1) and the ignition-by-ignition retard amount ΔθR(n).

Subsequently, in Step S212, one of the knock correction amount θR(n) and a value obtained by adding the knock correction amount advance return amount Ka (positive value) to the last virtual knock correction amount θRv(n−1), whichever is more on the retard side, is calculated as the virtual knock correction amount θRv(n) and the processing is ended. In other words, the virtual knock correction amount is updated in Step S212 by calculating [θRv(n)=min{ΔθR(n), min{θRv(n−1)+Ka, 0}}].

When the presence of a knock is determined in Step S202, computations of the knock correction amount ΔθR(n) and the virtual knock correction amount ΔθRv(n) are performed as described above.

A case where the absence of a knock is determined in Step S202 (No) will now be described. When the flow proceeds from Step S202 to Step S213, the knock correction amount θR(n) is updated to [θR(n)=min{θR(n−1)+Ka, θRclp}] with the last knock correction amount θR(n−1) and the knock correction amount advance return amount Ka (positive value). However, the updated knock correction amount is clipped to the knock correction amount clip value θRclp.

In Subsequent Step S214, the virtual knock correction amount θRv(n) is updated to [θRv(n)=min{θRv(n−1)+Ka, 0}] with the last virtual knock correction amount θRv(n−1) and the knock correction amount advance return amount Ka (positive value). It should be noted that the virtual knock correction amount θRv(n) is not clipped to the knock correction amount clip value θRclp.

Subsequently, in Step S215, the knock correction amount θR(n) is compared with the virtual knock correction amount θRv(n). When the knock correction amount θR(n) is more on the advance side, in other words, when [θRv(n)>θR(n)] is not established (No) because θR(n) is a negative value, the processing is ended. On the contrary, when the knock correction amount θR(n) is more on the retard side, in other words, [θRv(n)>θR(n)] is established because θR(n) is a negative value (Yes), the flow proceeds to Step S216, in which the clipping is cancelled by clearing the knock correction amount clip value θRclp to "0". In subsequent Step S217, the virtual knock correction amount θRv(n) is substituted for the knock correction amount θR(n) to update the knock correction amount and the processing is ended. The knock correction amount advance return amount Ka is set, for example, to a value with which an advance of about 1 deg CA is made for 2 seconds or 200 strokes.

As described above, the computation of the knock correction amount θR(n) is performed when the absence of a knock is determined in Step S202.

Figure 7:
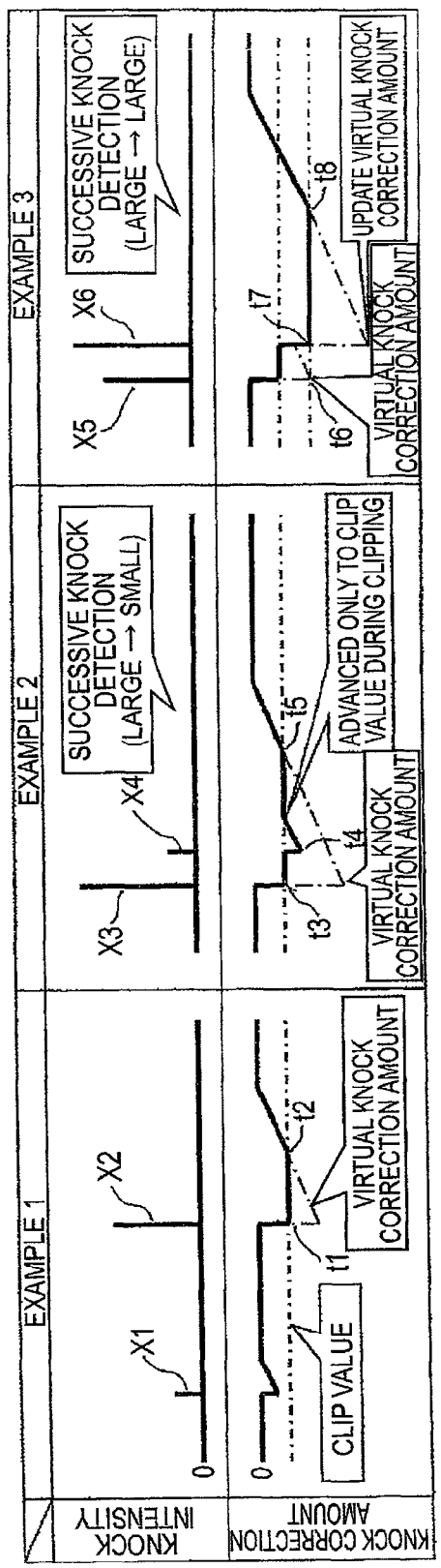
FIG. 7 is a time chart used to describe an operation of the knock control apparatus for an internal combustion engine according to the second embodiment of the invention.

FIG. 7 is a time chart used to describe an operation of the knock control apparatus for an internal combustion engine according to the second embodiment of the invention. In particular, it shows an operation in a case where the knock correction amount θR(n) and the virtual knock correction amount θRv(n) described in accordance with the flowchart of FIG. 6 above are computed. The terms, "a small knock" and "a large knock", referred to in the following description mean a case where a knock correction amount does not cross the clip value and a case where a knock correction amount crosses the clip value, respectively.

Referring to FIG. 7, Example 1 is a case where a knock correction amount by a small knock X1 and a knock correction amount by a large knock X2 do not overlap. In the case of Example 1, the knock correction amount is clipped to the clip value at a time point t1 and at the same time, a virtual knock correction amount is calculated to be more on the retard side than the knock correction amount. An advance return of the knock correction amount is started at a time point t2 at which the virtual knock correction amount becomes equal to the knock correction amount. In this manner, the virtual knock correction amount is calculated only when the knock correction amount is clipped and the knock correction amount is kept clipped until the time point t2 at which the virtual knock correction amount becomes equal to the knock correction amount.

Example 2 in FIG. 7 is a case where a large knock X3 and a small knock X4 are detected in succession. In this case, the knock correction amount is clipped at a time point t3 at which the large knock X3 is detected and at the same time the virtual knock correction amount is calculated to be more on the retard side than the knock correction amount. An advance return of the knock correction amount is started at a time point t5 at which the virtual knock correction amount becomes equal to the knock correction amount. When the small knock X4 is detected at a time point t4 between the time points t3 and t5, a further knock correction is made. However, because the knock correction amount is being kept clipped, the knock correction amount is advanced only to the clip value in this case.

Example 3 in FIG. 7 is a case where large knocks X5 and X6 are detected in succession at time points t6 and t7, respectively. In this case, the knock correction amount is clipped to the clip value at the time point t6 at which the large knock X5 is detected and at the same time the virtual knock correction amount is calculated to be more on the retard side than the knock correction amount. However, the virtual knock correction amount is updated at the time point t7 at which the next large knock X6 is detected and the knock correction amount is clipped on the basis of this updated virtual knock correction amount. The knock correction amount is kept held at the updated clip value until an updated time point t8.

With the knock control apparatus for internal combustion engine according to the second embodiment of the invention described above, by performing the computation of a knock correction amount as described above, it becomes possible to calculate a knock correction amount corresponding to the knock intensity when a knock is detected. Further, by limiting and holding the knock correction amount at a predetermined value, even for a large knock that occurs unexpectedly, not only does it become possible to suppress excessive torque down and torque fluctuation, but it also becomes possible to make matching of a holding time of the knock correction amount clip value unnecessary.

Third Embodiment

A knock control apparatus for an internal combustion engine according to a third embodiment of the invention will now be described. The configuration of the knock control apparatus for the internal combustion engine according to the third embodiment is generally the same as that of the second embodiment above. However, in contrast to the second embodiment where an advance return rate of the knock correction amount is constant, the third embodiment is characterized in that the advance return rate is fast immediately after a knock retard correction and the advance return rate is slowed down as the knock correction amount is approaching the knock limit. Further, the third embodiment is characterized in that matching man-hours are reduced.

Figure 8:
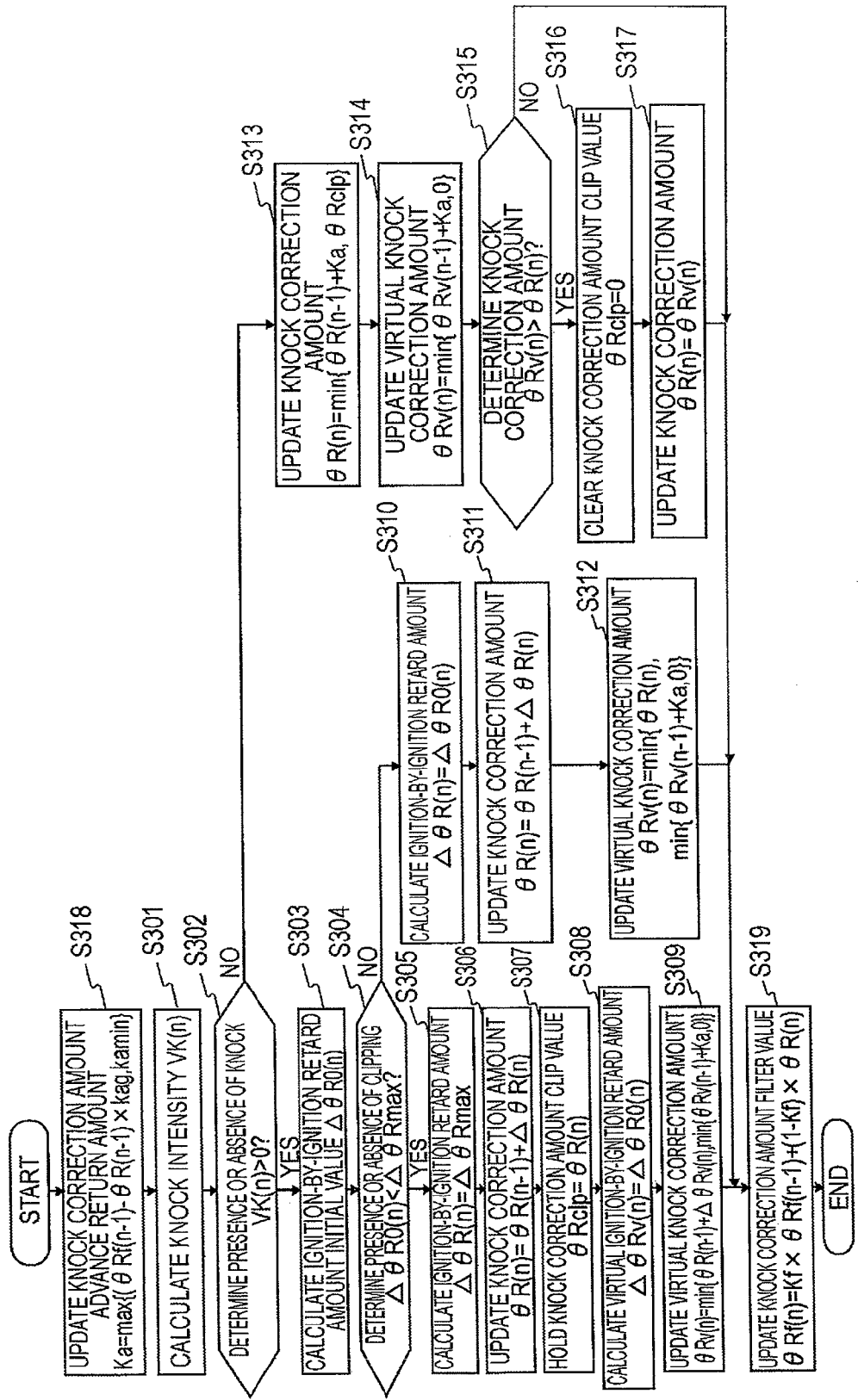
FIG. 8 is a flowchart depicting an operation of a knock control apparatus for an internal combustion engine according to a third embodiment of the invention.

Hereinafter, the knock control apparatus for the internal combustion engine according to the third embodiment of the invention will be described in detail. FIG. 8 is a flowchart used to describe an operation of the knock control apparatus for internal combustion engine according to the third embodiment of the invention. In particular, FIG. 8 shows processing in the ignition-by-ignition retard amount computation portion and the knock correction amount computation portion. The processing shown in FIG. 8 is performed by interruption processing in synchronization with a crank angle, for example, by interruption processing at 75° CA BTDC, as has been described above.

The content of the processing from Step S301 to Step S317 in FIG. 8 is the same as the content of the processing from Step S201 to Step S217 in the flowchart of FIG. 6 in the second embodiment above. Accordingly, only a different portion, Step S318 and Step S319, will be described in detail.

In order to clearly describe the characteristic of the knock control apparatus for the internal combustion engine according to the third embodiment of the invention, a computation in Step S319 performed after the processing from Step S301 to Step 317 will be described first. In Step S319, the knock control amount $\theta R(n)$ calculated by the processing from Step S301 to Step S317 is filtered to calculate a knock correction amount filter value $\theta Rf(n)$. Herein, Kf is a filter coefficient (0<Kf<1) and it is set, for example, to a value of about "0.95". The knock correction amount filter value, from which a high-frequency component of the knock correction amount under knock control is eliminated in this manner, can be thought to be substantially equal to the knock correction amount in the vicinity of the knock limit.

Subsequently, Step S318 will be described. Processing in Step S318 is performed before the processing from Step S301 to Step S317. In Step S318, a knock correction amount advance return amount Ka is calculated on the basis of a difference between the last knock correction amount filter value $\theta Rf(n-1)$ and the last knock correction amount $\theta R(n-1)$. More specifically, the knock correction amount advance return amount Ka is calculated as [Ka=max{($\theta Rf(n-1)-\theta R(n-1)$)×Kag, Kamin}]. Herein, Kag is a knock correction amount advance return amount reflection coefficient and Kamin is a minimum value of the knock correction amount advance return amount.

The knock correction amount advance return amount reflection coefficient Kag is set, for example, to a value with which an advance of about 1 deg CA is made for 2 seconds or 200 strokes. The knock correction amount advance return minimum value Kamin is set, for example, to a value with which an advance of about 0.2 deg CA is made for 2 seconds or 200 strokes. Even when a difference between the last knock correction amount filter value $\theta Rf(n-1)$ and the last knock correction amount $\theta R(n-1)$ becomes "0" or a negative value because of the knock correction amount advance return amount minimum value Kamin (Kamin>0), the knock correction amount advance return amount Ka can take a positive value.

The processing in Step S318 described above corresponds to a knock limit knock correction amount estimate unit in the third embodiment of the invention. This processing is to estimate a knock limit correction amount, which is the smallest in magnitude among knock correction amounts with which a knock no longer occurs, and to calculate a return amount by which to return the limited knock correction amount to be back on the advance side on the basis of a difference between the estimated knock limit knock correction amount and the current knock correction amount or the virtual knock correction amount.

By performing the processing from Step S301 to Step S317 using the knock correction amount advance return amount Ka calculated in this manner, it becomes possible to make the advance return rate variable in such a manner that the advance return rate becomes fast immediately after a knock retard correction is made on the knock correction amount and the advance return rate becomes slow when the knock correction amount approaches the knock limit.

Herein, the knock correction amount filter value $\theta Rf(n)$ is calculated by filtering the knock correction amount $\theta R(n)$ in Step S319 and the knock correction amount advance return value Ka is calculated with a difference between the knock correction amount filter value $\theta Rf(n)$ and the knock correction amount $\theta R(n)$ in Step S318. However, it may be configured in such a manner that a virtual knock correction amount filter value $\theta Rvf(n)$ is calculated by filtering the virtual knock correction amount $\theta Rv(n)$ in Step S319 and the knock correction amount advance return amount Ka is calculated from a difference between the virtual knock correction amount filter value $\theta Rvf(n)$ and the virtual knock correction amount $\theta Rv(n)$ in Step S318.

Figure 9:
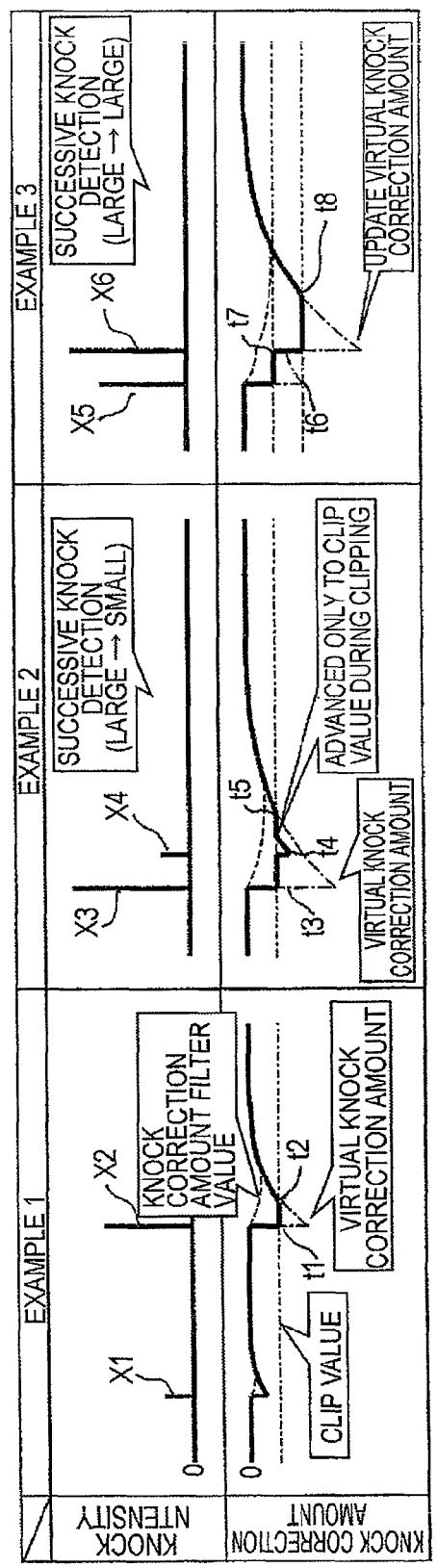
FIG. 9 is a time chart used to describe an operation of the knock control apparatus for an internal combustion engine according to the third embodiment of the invention.

FIG. 9 is a time chart used to describe an operation of the knock control apparatus for the internal combustion engine according to the third embodiment of the invention. In particular, it shows an operation in a case where the knock correction amount $\theta R(n)$ and the virtual knock correction amount $\theta Rv(n)$ described above in accordance with the flowchart of FIG. 8 are computed. The terms, "a small knock" and "a large knock", referred to in the following description mean a case where a knock correction amount does not cross the clip value and a case where a knock correction amount crosses the clip value, respectively.

Referring to FIG. 9, Example 1 is a case where a knock correction amount by a small knock X1 and a knock correction amount by a large knock X2 do not overlap. In the case of Example 1, the knock correction amount is clipped to the clip value at a time point t1 and at the same time the virtual knock correction amount is calculated to be more on the retard side than the knock correction amount. An advance return of the knock correction amount is started at a time point t2 at which the virtual knock correction amount becomes equal to the knock correction amount. When a difference between the knock correction amount filter value indicated by a broken line and the knock correction amount is large, the advance rate of the knock correction amount and the virtual knock correction amount becomes fast and when a difference between the knock correction amount filter value and the knock correction amount is small, the advance rate of the knock correction amount and the virtual knock correction amount becomes slow.

Example 2 in FIG. 9 is a case where a large knock X3 and a small knock X4 are detected in succession. In this case, the knock correction amount is clipped at a time point t3 at which the large knock X3 is detected and at the same time the virtual knock correction amount is calculated to be more on the retard side than the knock correction amount. An advance return of the knock correction amount is started at a time point t5 at which the virtual knock correction amount becomes equal to the knock correction amount. When the small knock X4 is detected at a time point t4 between the time points t3 and t5, a further knock correction is made. However, because the knock correction amount is being kept clipped, the knock correction amount is advanced only to the clip value in this case. Also in Example 2, when a difference between the knock correction amount filter value indicated by a broken line and the knock correction amount is large, the advance rate of the knock correction amount and the virtual knock correction amount becomes fast and when a difference between the knock correction amount filter value and the knock correction amount is small, the advance rate of the knock correction amount and the virtual knock correction amount becomes slow.

Example 3 in FIG. 9 is a case where large knocks X5 and X6 are detected in succession at time points t6 and t7, respectively. In this case, the knock correction amount is clipped to the clip value at the time point t6 at which the large knock X5 is detected and at the same time the virtual knock correction amount is calculated to be more on the retard side than the knock correction amount. However, the virtual knock correction amount is updated at the time point t7 at which the next large knock X6 is detected, and the knock correction amount is clipped on the basis of this updated virtual knock correction amount. The knock correction amount is kept held at the updated clip value until an updated time point t8. Also in Example 3, when a difference between the knock correction amount filter value indicated by a broken line and the knock correction amount is large, the advance rate of the knock correction amount and the virtual knock correction amount becomes fast and when a difference between the knock correction amount filter value and the knock correction amount is small, the advance rate of the knock correction amount and the virtual knock correction amount becomes slow.

With the knock control apparatus for the internal combustion engine according to the third embodiment of the invention described above, as an advance return is made fast in a case where the knock correction amount is far from the vicinity of the knock limit, it becomes possible to further suppress the occurrence of a torque down and a torque fluctuation. Further, by making the advance return rate of the knock correction amount slow in the vicinity of the knock limit, it becomes possible to suppress the occurrence of an unexpected knock per se. In addition, matching to make the advance return rate variable to enable such control can be readily performed.

Various modifications and alterations of this invention will be apparent to those skilled in the art without departing from the scope and spirit of this invention, and it should be understood that this is not limited to the illustrative embodiments set forth herein.

What is claimed is:

1. A knock control apparatus for an internal combustion engine, comprising:
    a knock sensor that detects a vibration of the internal combustion engine;
    a knock determination portion that determines a presence or absence of an occurrence of a knock in the internal combustion engine on the basis of an output of the knock sensor; and
    a knock correction amount computation portion that computes, on the basis of intensity of a knock that occurs when the presence of an occurrence of a knock is determined by the knock determination portion, a knock correction amount by which a spark timing of the internal combustion engine is moved to a retard side and returns back the knock correction amount to an advance side when the absence of an occurrence of a knock is determined by the knock determination portion, wherein
    when a value of the knock correction amount on the retard side becomes equal to or exceeds a predetermined value, the knock correction amount computation portion limits and holds the knock correction amount at the predetermined value and returns back the limited knock correction amount to the advance side after a predetermined time calculated on the basis of the intensity of a knock that occurs.

2. The knock control apparatus for an internal combustion engine according to claim 1, further comprising:
    a counter portion in which is set, at an occurrence of a knock, a count value according to the intensity of a knock that occurs, wherein
    the predetermined time is a time since a knock occurs until the count value in the count portion reaches a predetermined value.

3. A knock control apparatus for an internal combustion engine, according to claim 1:
    wherein when a value of the knock correction amount to the retard side becomes equal to or exceeds a predetermined value, the knock correction amount computation portion limits and holds the knock correction amount at the predetermined value, and computes, as a virtual knock correction amount, a knock correction amount by which the spark timing is moved to the retard side when the knock correction amount is not limited to use one of the knock correction amount held at the predetermined value and the computed virtual knock correction amount, whichever has a smaller absolute value, as a knock correction amount by which the spark timing is moved to the retard side.

4. The knock control apparatus for an internal combustion engine according to claim 3, wherein
    the knock correction amount computation portion includes a knock limit knock correction amount estimate unit that estimates a knock limit knock correction amount having the smallest absolute value among knock correction amounts with which no knock occurs and calculates a return amount by which the limited knock correction amount is returned back to the advance side on the basis of a difference between the estimated knock limit knock correction amount and one of a current knock correction amount and the virtual knock correction amount.

5. The knock control apparatus for an internal combustion engine according to claim 4, wherein
    the knock limit knock correction amount estimate unit calculates the knock limit knock correction amount by filtering one of the knock correction amount and the virtual knock correction amount.

* * * * *